United States Patent
Luo et al.

(10) Patent No.: US 9,726,817 B2
(45) Date of Patent: Aug. 8, 2017

(54) SMALL-DIAMETER POLARIZATION MAINTAINING OPTICAL FIBER

(71) Applicants: FIBERHOME TELECOMMUNICATION TECHNOLOGIES CO., LTD., Wuhan, Hubei Province (CN); Wuhan Fiberhome Ruiguang Technology CO., LTD., Wuhan, Hubei Province (CN)

(72) Inventors: Wenyong Luo, Wuhan (CN); Zhijian Liu, Wuhan (CN); Yili Ke, Wuhan (CN); Qi Mo, Wuhan (CN); Fuming Hu, Wuhan (CN); Qiong Lei, Wuhan (CN); Zhiwen Kang, Wuhan (CN); Rong Dan, Wuhan (CN); Lei Zhao, Wuhan (CN)

(73) Assignee: FIBERHOME TELECOMMUNICATION TECHNOLOGIES CO., LTD., Wuhan, Hubei Province (CN)

( * ) Notice: Subject to any disclaimer, the term of this patent is extended or adjusted under 35 U.S.C. 154(b) by 0 days.

(21) Appl. No.: 15/317,398

(22) PCT Filed: Nov. 3, 2015

(86) PCT No.: PCT/CN2015/093683
§ 371 (c)(1),
(2) Date: Dec. 8, 2016

(87) PCT Pub. No.: WO2016/110153
PCT Pub. Date: Jul. 14, 2016

(65) Prior Publication Data
US 2017/0139129 A1    May 18, 2017

(30) Foreign Application Priority Data
Jan. 7, 2015   (CN) .......................... 2015 1 0005831

(51) Int. Cl.
*G02B 6/36*    (2006.01)
*G02B 6/024*    (2006.01)
(Continued)

(52) U.S. Cl.
CPC ........... *G02B 6/024* (2013.01); *G02B 6/0286* (2013.01); *G02B 6/02395* (2013.01);
(Continued)

(58) Field of Classification Search
USPC ...................................................... 385/127
See application file for complete search history.

(56) References Cited

U.S. PATENT DOCUMENTS

2011/0176783 A1* 7/2011 Ooizumi ........... C03B 37/01446
385/127
2016/0289116 A1* 10/2016 Langner .................... C03C 3/06

\* cited by examiner

Primary Examiner — Eric Wong
(74) Attorney, Agent, or Firm — Kile Park Reed & Houtteman LLC

(57) ABSTRACT

Disclosed is a small-diameter polarization maintaining optical fiber, which relates to the field of special optical fibers. The small-diameter polarization maintaining optical fiber comprises a quartz optical fiber (5); the periphery thereof is provided with an inner coating (6) and an outer coating (8); the interior of the quartz optical fiber (5) is provided with an optical fiber core layer (1) and a quartz cladding (2); two stress zones (4) are arranged between the optical fiber core layer (1) and the quartz cladding (2); a buffer coating (7) is arranged between the inner coating (6) and the outer coating (8); the periphery of each stress zone (4) is provided with a buffer layer (3) which is concentric with the stress zone (4); when a working wavelength of a small-diameter polarization maintaining optical fiber is 1310 nm, the attenuation thereof reaches less than 0.5 dB/km, and the crosstalk reaches −35 dB/km; and when the working wavelength of the small-diameter polarization maintaining optical fiber is 1550 nm,
(Continued)

the attenuation thereof reaches less than 0.4 dB/km, and the crosstalk reaches −30 dB/km. The optical fiber not only has excellent stability characteristics of attenuation and crosstalk, but also has the excellent stability characteristic of long-term operation, and can provide a better optical fiber ring for research on a high-precision optical fiber gyroscope, thereby laying the foundation for the development directions of miniaturization and high precision of the optical fiber gyroscope.

20 Claims, 3 Drawing Sheets

(51) Int. Cl.
    *G02B 6/036*     (2006.01)
    *G02F 1/01*     (2006.01)
    *G02B 6/028*     (2006.01)
    *G02B 6/02*     (2006.01)

(52) U.S. Cl.
    CPC ......... *G02B 6/036* (2013.01); *G02B 6/03688* (2013.01); *G02F 1/0134* (2013.01)

SMALL-DIAMETER POLARIZATION MAINTAINING OPTICAL FIBER

TECHNICAL FIELD

The present invention relates to the field of special optical fiber, particularly to a small-diameter polarization maintaining optical fiber.

BACKGROUND ART

PMF (Polarization Maintaining Optical Fiber) is a kind of special optical fiber that realizes the single-mode transmission characteristic of light while maintaining its linear polarization state. Since PMF has the effect of stress birefringence, therefore PMF can maintain the polarization state well when transmitting linearly polarized light. The linear polarization maintaining capability of PMF is of utility value in many polarization-dependent applications (such as multidimensional multiplexed coherent communications, optical fiber gyro technology, current mutual inductance technology, optical fiber hydrophones and polarization sensing).

When PMF is used in the optical fiber gyro, the PMF will be wound into optical fiber ring for the application. Optical fiber ring is the core component of the optical fiber gyro, the performance of the optical fiber ring directly determines the performance of optical fiber gyro, the length of optical fiber in optical fiber ring determines the accuracy of optical fiber gyro, and the performance of optical fiber itself determines the performance of environmental adaptability of the optical fiber gyro. The use of the environment and the process of optical fiber gyro adopting PMF are not the same with general communication optical fiber, the key of optical fiber gyro adopting PMF is focusing on optical fiber's performance indicators such as mechanical, optical polarization and environmental adaptability (mainly including room temperature crosstalk, full temperature crosstalk, normal temperature loss, full temperature additional loss change, mode field diameter, beat length, tension screening, cladding diameter, coating diameter, etc.).

The categories of PMF mainly include geometrical birefringence polarization maintaining optical fiber and stress birefringence polarization maintaining optical fiber. The geometrical birefringence polarization maintaining optical fiber is mainly elliptical core polarization maintaining optical fiber, when the geometrical birefringence polarization maintaining optical fiber is used, it uses the geometrical asymmetry of the core to realize the birefringent effect for controlling the linear polarization state of the light. The stress birefringence polarization maintaining optical fiber mainly includes tie-type polarization maintaining optical fiber, elliptical cladding type polarization maintaining optical fiber and Panda-type polarization maintaining optical fiber; when the birefringence polarization maintaining optical fiber is used, the material whose coefficient of expansion has a large difference from the cladding material is introduced into the cladding to form the stress zone, the birefringence effect is achieved by compressing the mode field of the light transmitted by the core by stress to maintain the linear polarization properties of the light.

Since the Panda-type polarization maintaining optical fiber has been successfully introduced, driven by the technical requirements of the optical fiber gyro, the evolution of cladding diameter/coating diameter of the Panda-type polarization maintaining optical fiber is 200 μm/400 μm, 125 μm/245 μm and 80 μm/165 μm. When the cladding diameter of the Panda-type polarization maintaining optical fiber is 80 μm, its coating diameter can be as small as about 165 μm, compared with the conventional optical fiber of 125 μm/245 μm, the coating diameter (165 μm) of the Panda-type polarization maintaining optical fiber of 80 μm/165 μm is decreased by more than 30%, the volume is decreased by more than 50%.

In summary, the optical fiber gyro has a smaller overall dimension when the Panda-type polarization maintaining optical fiber of 80 μm/165 μm acting as its optical fiber ring, and then brings a series of benefits for the application of the optical fiber gyro, among which the effect of improving the temperature performance of optical fiber ring is the most remarkable. However, with the further development of optical fiber gyro technology, and the development and application of current mutual inductance technology for smart grid, the optical fiber ring needs better temperature performance and smaller size.

Faced with this new requirement, it is necessary to develop a polarization maintaining optical fiber of smaller overall dimension; conventionally, the method of reducing the overall dimension of the polarization maintaining optical fiber is generally simply to reduce the diameter of the fiber directly. However, because of the smaller diameter and thinner coating of the optical fiber, further lead to a puzzle that the optical fiber has lower resistance to external interference, so the traditional method of reducing the overall dimension of polarization maintaining optical fiber is difficult to be applied to the optical fiber gyro with high precision demand.

Therefore, the urgent problem of many application techniques such as optical fiber gyro, mutual inductor of high-performance is how to develop a polarization maintaining optical fiber which not only has good fusion performance with conventional communication optical fiber and polarization maintaining optical fiber, but also has a much smaller volume, and also has excellent geometry and optical properties.

It is well known that when there is time-varying temperature perturbation of a section of optical fiber in an optical fiber ring, two back-propagating light waves pass through the optical fiber at different times and undergo different phase shifts due to temperature disturbances, this phase shift is a nonreciprocal phase shift (i.e. the Shupe effect) caused by ambient temperature. The measurement error of optical fiber gyro caused by the Shupe effect is known as the Shupe error.

The temperature change rate of certain section of optical fiber is usually caused by the temperature gradient of the inner and outer sides of the optical fiber ring caused by the ambient temperature, the temperature rate sensitivity which characterizes the Shupe error is also called temperature gradient sensitivity. The offset drift of optical fiber gyro caused by ambient temperature is caused by the rate of temperature change, since the Shupe error is not distinguishable from the Sagnac effect phase shift caused by rotation, it is necessary to take measures to suppress the temperature drift of the optical fiber gyro.

Now the method of suppressing the temperature drift of optical fiber gyro is as follows: the optical fiber ring is wound by symmetrical winding method such as quadrupole or octupole, and so on, the order of the adjacent two pairs of optical fiber layers is opposite to compensate the radial temperature field gradient. This method is very effective to suppress the Shupe error in optical fiber gyro, but due to the limitations of the process equipment, the state of optical fiber ring winding is still non-ideal, in medium and high precision optical fiber gyro applications, the residual temperature drift is still not negligible.

The small-diameter polarization maintaining optical fiber can suppress the temperature drift of the optical fiber gyro, and the cladding diameter of the small-diameter polarization maintaining optical fiber is 80 μm or less, and the coating diameter ranges from 90~140 μm. Compared with polarization maintaining optical fiber with 80/165 μm (cladding diameter/coating diameter), the bend performance of the small-diameter polarization maintaining optical fiber is better; The same length of the optical fiber can be wound a ring of smaller size, while the number of layers in the gyro structure is also reduced, the temperature difference between the inside and outside the optical fiber ring decreases, which can effectively suppress the Shupe error of optical fiber gyro, and improve the full temperature performance of the optical fiber gyro. At the same time, as for the optical fiber gyro with determined geometric dimensions, by using small-diameter polarization maintaining optical fiber, a longer optical fiber ring can be winded, the limit accuracy of optical fiber gyro can be greatly improved under the same dimension, and the miniaturization application requirements of medium and high precision optical fiber gyro can be met.

However, with the continuous reduction of geometry dimension of optical fiber, how to reduce the cladding diameter and coating diameter of optical fiber while maintaining the excellent performance of polarization maintaining optical fiber has become a major problem in optical fiber design and manufacturing process.

SUMMARY OF THE INVENTION

In view of the drawbacks of the prior art, the present invention aims to provide a kind of small-diameter polarization maintaining optical fiber, which not only has excellent stability characteristics of attenuation and crosstalk, but also has the excellent stability characteristic of long-term operation, and can provide a better optical fiber ring for research on a high-precision optical fiber gyroscope, thereby laying the foundation for the development directions of miniaturization and high precision of the optical fiber gyroscope.

In order to achieve the above purpose, the present invention provides: a small-diameter polarization maintaining optical fiber, comprising quartz optical fiber, the periphery of the quartz optical fiber is provided with an inner coating and an outer coating, the inner of the quartz optical fiber is provided with an optical fiber core layer and a quartz cladding, and the quartz cladding is located at the periphery of the optical fiber core layer; two stress zones are provided between the optical fiber core layer and the quartz cladding, and the two stress zones are symmetrically distributed along the center of the optical fiber core layer; a buffer coating is provided between the inner coating and the outer coating, the periphery of each stress zone is provided with a buffer layer which is concentric with the stress zone;
the refractive index of the optical fiber core layer is $n_O$, the refractive index of the buffer layer is $n_B$, the refractive index of the quartz cladding is $n_Q$; the refractive index of the stress zone is $n_{SZ}$, the refractive index of the periphery of stress zone is $n_{SZP}$, the refractive index of the center of the stress zone is $n_{SZC}$;
the relative refractive index difference $\Delta n_O$ of $n_O$ and $n_Q$ is 0.5%-1.3%, the relative refractive index difference $\Delta n_B$ of $n_B$ and $n_Q$ is $-0.1\%$--$0.4\%$; the relative refractive index difference $\Delta n_{SZP}$ of $n_{SZP}$ and $n_Q$ is $-0.1\%$--$0.4\%$, the relative refractive index difference $\Delta n_{SZC}$ of $n_{SZC}$ and $n_Q$ is $-1.2\%$--$0.8\%$;
when working wavelength of the small-diameter polarization maintaining optical fiber is 1310 nm, its attenuation is below 0.5 dB/km, and its crosstalk reaches $-35$ dB/km; when working wavelength of the small-diameter polarization maintaining optical fiber is 1550 nm, its attenuation is below 0.4 dB/km, and its crosstalk reaches $-30$ dB/km.

Based on the above-mentioned technical scheme, the diameter of the optical fiber core layer is $d_O$, the diameter of the buffer layer is $d_B$, the diameter of the quartz optical fiber is $d_Q$, the diameter of the stress zone is $d_{SZ}$; the ratio of $d_O$ and $d_Q$ is 0.05-0.08, the ratio of $d_B$ and $d_{SZ}$ is 1.0-1.2, the ratio of $d_{SZ}$ and $d_Q$ is 0.2-0.4.

Based on the above-mentioned technical scheme, the diameter of the inner coating is $d_{IC}$, the diameter of the buffer coating is $d_{BC}$, the diameter of the outer coating is $d_{OC}$, the ratio of $d_{IC}$ and $d_{OC}$ is 0.65-0.85, the ratio of $d_{BC}$ and $d_{OC}$ is 0.75-0.9.

Based on the above-mentioned technical scheme, the diameter $d_Q$ of the quartz optical fiber 50 um or 80 um, the $d_{OC}$ is 90 um-140 um.

Based on the above-mentioned technical scheme, the Young's modulus of the inner coating is 0.05 Mpa-20 Mpa, and the Young's modulus of the outer coating is 0.5 Gpa-1.5 Gpa; the Young's modulus of the buffer coating is 0.1 Mpa-600 MPa, and the Young's modulus of the buffer coating is between the inner coating and the outer coating.

Based on the above-mentioned technical scheme, when producing the inner coating, the buffer coating and the outer coating, the inner coating is coated with a single mold and cured by ultraviolet rays, then the buffer coating and the outer coating are simultaneously coated with a double molds, and finally the buffer coating and the outer coating are simultaneously cured by ultraviolet rays.

Based on the above-mentioned technical scheme, the formula for calculating the relative refractive index difference is: $\Delta = (n_R - n_Q)/(n_R + n_Q) \cdot 100\%$, wherein $\Delta$ is the relative refractive index difference; when calculating the relative refractive index difference of the optical fiber core layer and the quartz cladding, $n_R$ in the above formula is $n_O$; when calculating the relative refractive index difference of the buffer layer and the quartz cladding, $n_R$ in the above formula is $n_B$; when calculating the relative refractive index difference of the periphery of stress zone and the quartz cladding, $n_R$ in the above formula is $n_{SZP}$; and when calculating the relative refractive index difference of the center of stress zone and the quartz cladding, $n_R$ in the above formula is $n_{SZC}$;

Based on the above-mentioned technical scheme, the optical fiber core layer is prepared through germanium doping, and the buffer layer is prepared through shallow boron doping, and the stress zone is prepared through deep boron doping.

Compared with the prior art, the advantage of the present invention is that:

(1) the present invention designs a new waveguide structure of polarization maintaining optical fiber, and a buffer layer is provided around the stress zone of the polarization maintaining optical fiber, the stress zone adopts a smooth parabolic waveguide structure, the core area is a parabolic combined platform type waveguide structure. Therefore, the present invention can solve the problem of large attenuation due to the large proportion of the stress zone in the whole quartz area in the case that the cladding diameter of the optical fiber decreases.

At the same time, the invention has a thin buffer coating between the conventional inner coating and outer coating, thus can effectively solve the difficult problem of excellent crosstalk control of polarization maintaining optical fiber due to the thinning of the coating in the case of thin coating.

In summary, the present invention provides a base for the further thinning of the diameter of the polarization maintaining optical fiber through the double buffer design of the buffer layer and the buffer coating, in the present invention, the small-diameter polarization maintaining optical fiber with dual buffer design not only has excellent stability characteristics of attenuation and crosstalk, but also has the excellent stability characteristic of long-term operation, and can provide a better optical fiber ring for research on a high-precision optical fiber gyroscope, thereby laying the foundation for the development directions of miniaturization and high precision of the optical fiber gyroscope.

(2) In order to well realize the inner coating, buffer coating and the outer coating (can be perceived as a sandwich type coating), the present invention develops a new coating technology of dry plus wet plus wet, i.e., the inner coating is a single mold coating, and the buffer coating and outer coating are simultaneously coated with double molds, so that a good cure of the optical fiber can be achieved using two coating curing techniques in the case that the optical fiber has a three-layer coating structure, which provides a feasible technique for the development of polarization maintaining optical fiber with characteristics of excellent attenuation and crosstalk.

In figures: 1—optical fiber core layer, 2—quartz cladding, 3—buffer layer, 4—stress zone, 5—quartz optical fiber, 6—inner coating, 7—buffer coating, and 8—outer coating.

DETAILED DESCRIPTION OF THE INVENTION

The invention will now be described in further detail with reference to the accompanying drawings and examples.

Figure 1:
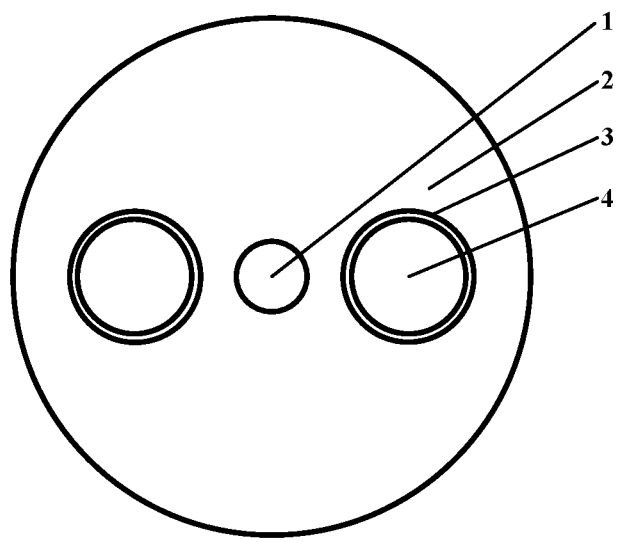
FIG. 1 is a schematic structural view of quartz end face of the small-diameter polarization maintaining optical fiber in an embodiment of the present invention.
Figure 2:
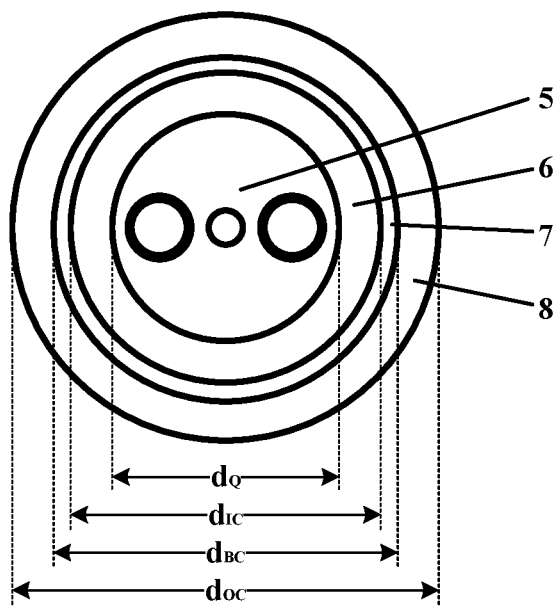
FIG. 2 is a schematic structural view of coating end face of the small-diameter polarization maintaining optical fiber in an embodiment of the present invention.

Referring to FIGS. 1 and 2, the small-diameter polarization maintaining optical fiber of an embodiment of the present invention comprises quartz optical fiber 5, the inner of the quartz optical fiber 5 is provided with an optical fiber core layer 1 and a quartz cladding 2, and the quartz cladding 2 is located at the periphery of the optical fiber core layer 1. Two stress zones 4 are provided between the optical fiber core layer 1 and the quartz cladding 2, the two stress zones 4 are symmetrically distributed along the center of the optical fiber core layer 1, the periphery of each stress zone 4 is provided with a buffer layer 3 which is concentric with the stress zone 4. The periphery of the quartz optical fiber 5 is provided with an inner coating 6 and an outer coating 8, the buffer coating 7 is provided between the inner coating 6 and the outer coating 8.

The refractive index of the optical fiber core layer 1 is $n_O$, the refractive index of the buffer layer 3 is $n_B$, the refractive index of the quartz cladding 2 is $n_Q$; the refractive index of the stress zone 4 is $n_{SZ}$, the refractive index of the periphery of stress zone 4 is $n_{SZP}$, the refractive index of the center of the stress zone 4 is $n_{SZC}$.

In the embodiments of the present invention, the formula for calculating the relative refractive index difference of the small-diameter polarization maintaining optical fiber is: $\Delta=(n_R-n_Q)/(n_R+n_Q)\cdot 100\%$, wherein $\Delta$ is the relative refractive index difference; when calculating the relative refractive index difference of the optical fiber core layer 1 and the quartz cladding 2, $n_R$ in the above formula is $n_O$; when calculating the relative refractive index difference of the buffer layer 3 and the quartz cladding 2, $n_R$ in the above formula is $n_B$; when calculating the relative refractive index difference of the periphery of stress zone 4 and the quartz cladding 2, $n_R$ in the above formula is $n_{SZP}$; when calculating the relative refractive index difference of the center of stress zone 4 and the quartz cladding 2, $n_R$ in the above formula is $n_{SZC}$.

Figure 3:
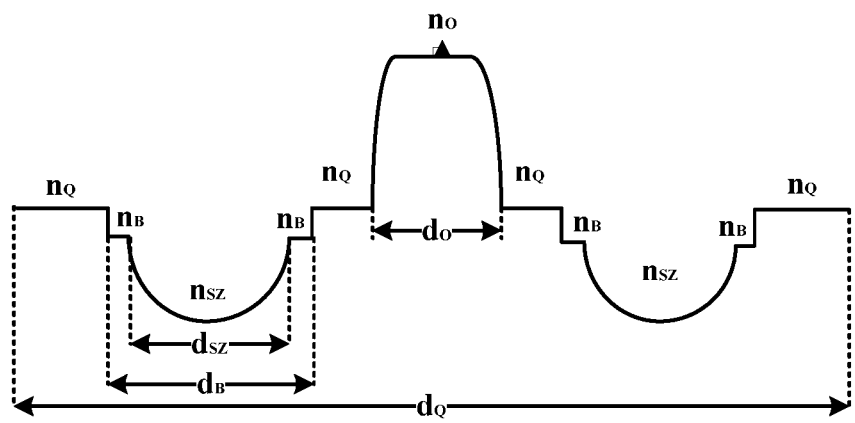
FIG. 3 is the schematic view of the waveguide structure with the stress zone of the small-diameter polarization maintaining optical fiber in an embodiment of the present invention.

Referring to FIG. 3, the waveguide structure of optical fiber core layer 1 is a stepped waveguide structure, the optical fiber core layer 1 is prepared through germanium doping, and the relative refractive index difference $\Delta n_O$ of $n_O$ and $n_Q$ is 0.5%-1.3%. The buffer layer 3 is prepared through shallow boron doping, and the relative refractive index difference $\Delta n_B$ of $n_B$ and $n_Q$ is −0.1%-−0.4%. The stress zone 4 is prepared through deep boron doping, the relative refractive index difference $\Delta n_{SZP}$ of $n_{SZP}$ and $n_Q$ is −0.1%-−0.4%, the relative refractive index difference $\Delta n_{SZC}$ of $n_{SZC}$ and $n_Q$ is −1.2%-−0.8%.

The diameter of the optical fiber core layer 1 is $d_O$, the diameter of the buffer layer 3 is $d_B$, the diameter of the quartz optical fiber 5 (ie quartz cladding 2) is $d_Q$, the diameter of the stress zone 4 is $d_{SZ}$; the ratio of $d_O$ and $d_Q$ is 0.05-0.08, the ratio of $d_B$ and $d_{SZ}$ is 1.0-1.2, the ratio of $d_{SZ}$ and $d_Q$ is 0.2-0.4.

In the embodiments of the present invention, the diameter $d_Q$ of the quartz optical fiber 5 is 50 um or 80 um, the diameter of the inner coating 6 is $d_{IC}$, the diameter of the buffer coating 7 is $d_{BC}$, the diameter $d_{OC}$ of the outer coating 8 is 90 um-140 um. The ratio of $d_{IC}$ and $d_{OC}$ is 0.65-0.85, and the ratio of $d_{BC}$ and $d_{OC}$ is 0.75-0.9.

The Young's modulus of the buffer coating 7 is between the inner coating 6 and the outer coating 8, the Young's modulus of the inner coating 6 is 0.05 Mpa-20 Mpa, and the Young's modulus of the outer coating 8 is 0.5 Gpa-1.5 Gpa, the Young's modulus of the buffer coating 7 is 0.1 Mpa-600 MPa.

The inner coating 6, the buffer coating 7 and the outer coating 8 are each formed by ultraviolet curing, specifically: the inner coating 6 is coated with a single mold and cured by ultraviolet rays, then the buffer coating 7 and the outer coating 8 are simultaneously coated with a double molds, and finally the buffer coating 7 and the outer coating 8 are simultaneously cured by ultraviolet rays, thereby achieving a special dry plus wet plus wet coating curing.

In the embodiments of the present invention, when working wavelength of the small-diameter polarization maintaining optical fiber is 1310 nm, its attenuation is below 0.5 dB/km, and its crosstalk reaches −35 dB/km; when working wavelength of the small-diameter polarization maintaining optical fiber is 1550 nm, its attenuation is below 0.4 dB/km, and its crosstalk reaches −30 dB/km.

The manufacturing principle of the small-diameter polarization maintaining optical fiber in the embodiments of the present invention is as follows:
when $\Delta n_O$ is larger, the mode field diameter can be controlled smaller, the bending resistance of the polarization maintaining optical fiber will be stronger, when $\Delta n_O$ is smaller, the attenuation of the polarization maintaining optical fiber will be better, while the mode field diameter will become larger, the bending resistance of the polarization maintaining optical fiber will be weaker.

The $n_B$, $n_O$ and $n_{SZC}$ should be matched, when the $n_O$ is higher, and the $n_{SZC}$ is larger, the value of $n_B$ can be larger, at this point the polarization maintaining optical fiber should be provided with lower buffering capacity; when the larger value of $n_O$ is smaller, and the lower value of n4 is smaller, the value of n3 can be smaller, at this point the polarization maintaining optical fiber should be provided with higher buffering capacity.

The $\Delta n_{SZP}$ and $\Delta n_{SZC}$ can control refractive index range, thereby achieving good crosstalk and beat length control under the condition of the small-diameter polarization maintaining optical fiber.

The specific diameter ratio of the present invention can realize the good mode field diameter, the cut-off wavelength and the optical fiber's performance control of crosstalk and beat length of the polarization maintaining optical fiber.

The detailed description of the small-diameter polarization maintaining optical fiber of the present invention is carried out by 2 embodiments below.

Embodiment 1

Four kinds of small-diameter polarization maintaining optical fiber with the diameter $d_Q$ of the quartz optical fiber 5 is 80 um: optical fiber 1, optical fiber 2, optical fiber 3, optical fiber 4, the specific parameters of optical fiber 1, optical fiber 2, optical fiber 3 and optical fiber 4 are shown in Table 1.

TABLE 1 parameters table of four kinds of small-diameter polarization maintaining optical fiber when $d_Q$ is 80 um

| Parameter name | optical fiber 1 | optical fiber 2 | optical fiber 3 | optical fiber 4 |
|---|---|---|---|---|
| $d_O/d_Q$ | 0.05 | 0.06 | 0.07 | 0.08 |
| $\Delta n_O$ | 1.2% | 0.8% | 1.3% | 0.50% |
| $d_B/d_{SZ}$ | 1.0 | 1.1 | 1.2 | 1.05 |
| $\Delta n_B$ | −0.3% | −0.85% | −0.4% | −0.1% |
| $d_{SZ}/d_Q$ | 0.2 | 0.35 | 0.4 | 0.25 |
| $\Delta n_{SZC}$ | −0.9% | −1.05% | −1.2% | −0.8% |
| $\Delta n_{SZP}$ | −0.3% | −0.85% | −0.4% | −0.1% |
| $d_{OC}$ (um) | 120 | 135 | 140 | 125 |
| $d_{IC}/d_{OC}$ | 0.65 | 0.85 | 0.75 | 0.7 |
| $d_{BC}/d_{OC}$ | 0.75 | 0.8 | 0.9 | 0.85 |
| Young's modulus of inner coating 6 (Mpa) | 0.05 | 0.1 | 0.5 | 20 |
| Young's modulus of buffer coating 7 (Mpa) | 250 | 0.1 | 10 | 600 |
| Young's modulus of outer coating 8 (Mpa) | 1.5 | 0.8 | 0.5 | 1.0 |
| working wavelength | 1310 | 1310 | 1550 | 1550 |
| attenuation dB/km | 0.43 | 0.32 | 0.28 | 0.35 |
| crosstalk dB/km | −32 | −35 | −30 | −27 |

Embodiment 2

Four kinds of small-diameter polarization maintaining optical fiber with the diameter $d_Q$ of the quartz optical fiber 5 is 50 um: optical fiber 5, optical fiber 6, optical fiber 7, optical fiber 8, the specific parameters of optical fiber 5, optical fiber 6, optical fiber 7 and optical fiber 8 are shown in Table 2.

TABLE 2 parameters table of four kinds of small-diameter polarization maintaining optical fiber when $d_Q$ is 50 um

| Parameter name | optical fiber 5 | optical fiber 6 | optical fiber 7 | optical fiber 8 |
|---|---|---|---|---|
| $D_O/d_Q$ | 0.06 | 0.05 | 0.07 | 0.08 |
| $\Delta n_O$ | 1.3% | 0.5% | 0.8% | 1.2 |
| $d_B/d_{SZ}$ | 1.1 | 1.0 | 1.05 | 1.2 |
| $\Delta n_B$ | −0.3% | −0.85% | −0.4% | −0.1% |
| $d_{SZ}/d_Q$ | 0.25 | 0.4 | 0.35 | 0.2 |
| $\Delta n_{SZC}$ | −0.8% | −1.05% | −1.2% | −0.9% |
| $\Delta n_{SZP}$ | −0.1% | −0.85% | −0.4% | −0.3% |
| $d_{OC}$ (um) | 90 | 105 | 135 | 110 |
| $d_{IC}/d_{OC}$ | 0.65 | 0.75 | 0.8 | 0.7 |
| $d_{BC}/d_{OC}$ | 0.75 | 0.9 | 0.8 | 0.85 |
| Young's modulus of inner coating 6 (Mpa) | 20 | 0.5 | 0.2 | 0.05 |
| Young's modulus of buffer coating 7 (Mpa) | 250 | 10 | 0.2 | 600 |
| Young's modulus of outer coating 8 (Mpa) | 1 | 0.8 | 0.5 | 1.5 |
| working wavelength | 1310 | 1310 | 1550 | 1550 |
| attenuation dB/km | 0.46 | 0.42 | 0.36 | 0.39 |
| crosstalk dB/km | −39 | −35 | −30 | −25 |

Figure 4:
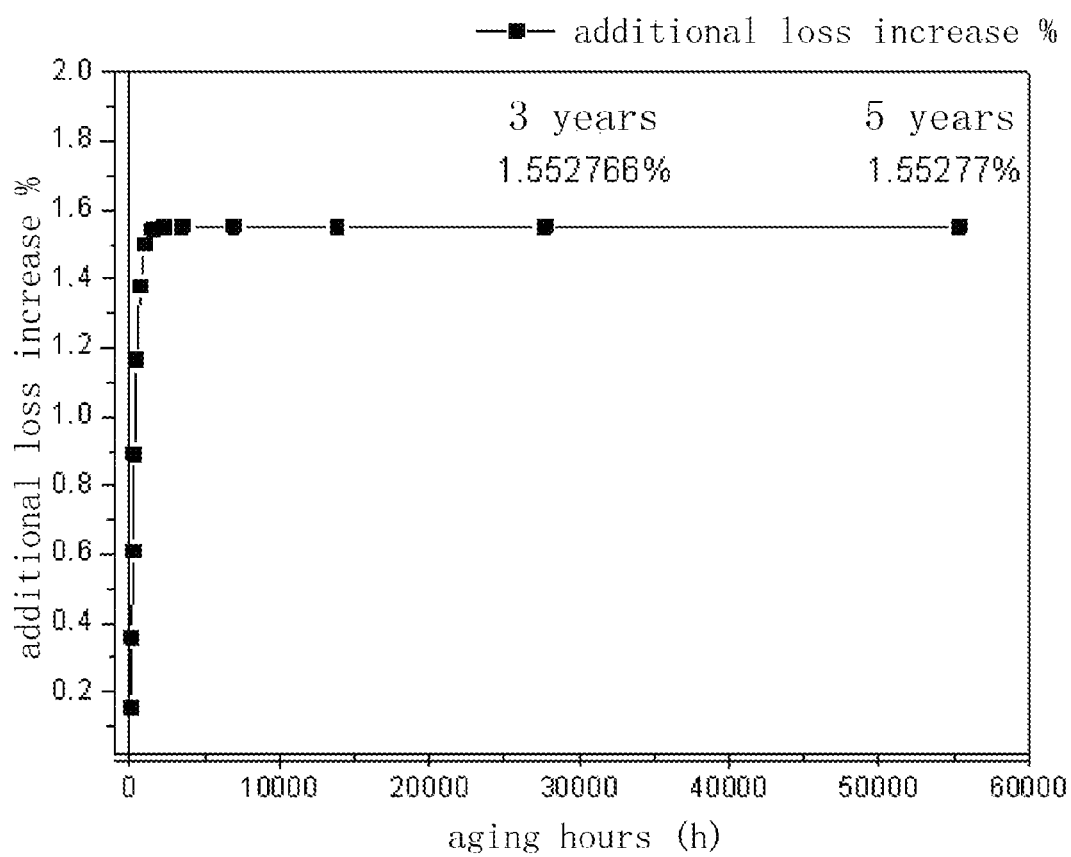
FIG. 4 is a trend graph showing the stability characteristic curve of the optical fiber attenuation under the long-term aging condition of the small-diameter polarization maintaining optical fiber in an embodiment of the present invention.
Figure 5:
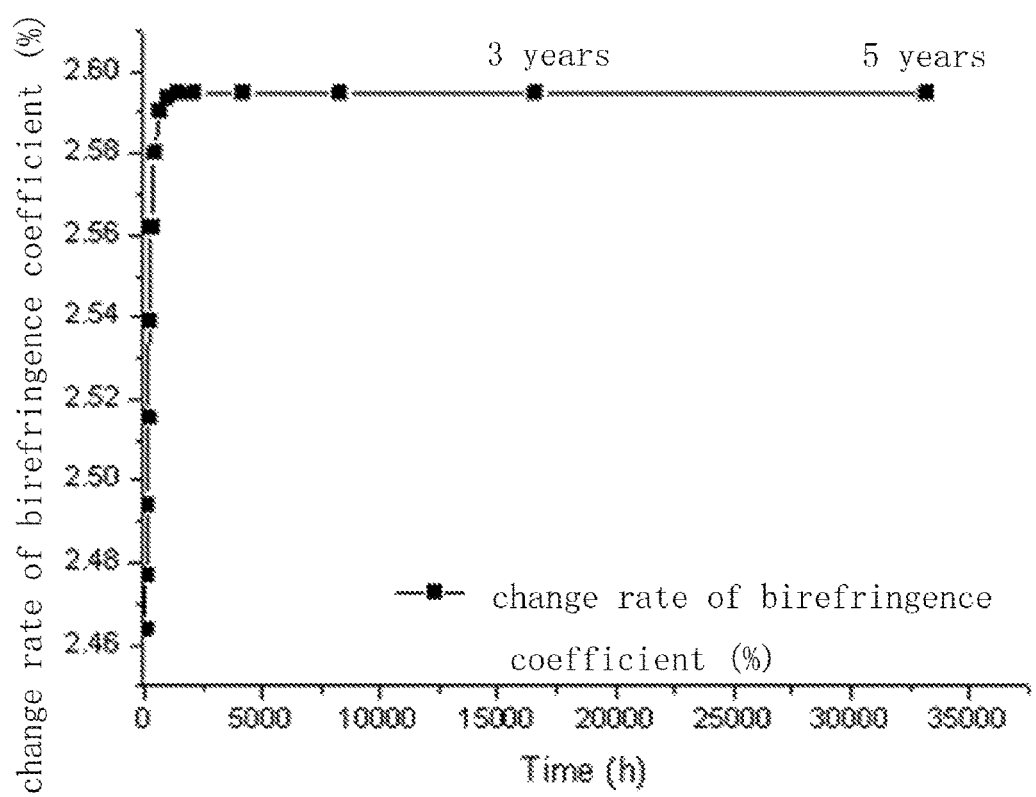
FIG. 5 is a trend graph showing the stability characteristic curve of the optical fiber crosstalk under the long-term aging condition of the small-diameter polarization maintaining optical fiber in an embodiment of the present invention.

The optical fibers obtained in embodiments 1 and 2 are subjected to a long-term aging test at 85 degrees high temperature and 85% humidity in the present invention. Through the repeated test of many samples in the past one month, the theoretical value of stable operating characteristics of optical fiber attenuation and crosstalk is obtained under the condition of the optical fiber working 5 years after a lot of data analysis. Referring to FIG. 4, the increase in attenuation coefficient will not exceed 1.6% of its intrinsic additional attenuation for 5 years under conditions of 85° C. and 85% humidity. For the polarization maintaining optical fiber with an additional loss of less than 0.05 dB when leaving the factory, the attenuation coefficient of the polarization maintaining optical fiber is increased by about 0.0008 dB in the 5 year. Referring to FIG. 5, under the conditions of temperature 85 degree and humidity 85%, after 5 years, the birefringence of the optical fiber will be reduced by about 2.6% under the same external stress condition, and will keep the balance.

The present invention is not limited to the embodiments described above, and modifications and improvements may be made to those skilled in the art without departing from the principles of the present invention, which are also regarded as the protection of the present invention. What is not described in detail in this specification belongs to the prior art known to those skilled in the art.

The invention claimed is:

1. A small-diameter polarization maintaining optical fiber, comprising quartz optical fiber (5), the periphery of the quartz optical fiber (5) is provided with an inner coating (6) and an outer coating (8), the inner of the quartz optical fiber (5) is provided with an optical fiber core layer (1) and a quartz cladding (2), the quartz cladding (2) is located at the periphery of the optical fiber core layer (1); two stress zones (4) are provided between the optical fiber core layer (1) and the quartz cladding (2), the two stress zones (4) are symmetrically distributed along the center of the optical fiber core layer (1); characterized in that: a buffer coating (7) is provided between the inner coating (6) and the outer coating (8), the periphery of each stress zone (4) is provided with a buffer layer (3) which is concentric with the stress zone (4);

the refractive index of the optical fiber core layer (1) is $n_O$ (optical fiber core layer), the refractive index of the buffer layer (3) is $n_B$ (Buffer layer), the refractive index of the quartz cladding (2) is $n_Q$ (Quartz cladding); the refractive index of the stress zone (4) is $n_{SZ}$ (stress zone), the refractive index of the periphery of stress zone (4) is $n_{SZP}$ (periphery of stress zone), the refractive index of the center of the stress zone (4) is $n_{SZC}$ (center of the stress zone);

the relative refractive index difference $\Delta n_O$ of $n_O$ and $n_Q$ is 0.5%-1.3%, the relative refractive index difference $\Delta n_B$ of $n_B$ and $n_Q$ is −0.1%−−0.4%; the relative refractive index difference $\Delta n_{SZP}$ of $n_{SZP}$ and $n_Q$ is −0.1%−−0.4%, the relative refractive index difference $\Delta n_{SZC}$ of $n_{SZC}$ and $n_Q$ is −1.2%−−0.8%;

when working wavelength of the small-diameter polarization maintaining optical fiber is 1310 nm, its attenuation is below 0.5 dB/km, and its crosstalk reaches −35 dB/km; when working wavelength of the small-diameter polarization maintaining optical fiber is 1550 nm, its attenuation is below 0.4 dB/km, and its crosstalk reaches −30 dB/km.

2. The small-diameter polarization maintaining optical fiber according to claim 1, characterized in that: the diameter of the optical fiber core layer (1) is $d_O$ (optical fiber core layer), the diameter of the buffer layer (3) is $d_B$ (buffer layer), the diameter of the quartz optical fiber (5) is $d_Q$ (quartz optical fiber), the diameter of the stress zone (4) is $d_{SZ}$ (stress zone); the ratio of $d_O$ and $d_Q$ is 0.05-0.08, the ratio of $d_B$ and $d_{SZ}$ is 1.0-1.2, the ratio of $d_{SZ}$ and $d_Q$ is 0.2-0.4.

3. The small-diameter polarization maintaining optical fiber according to claim 1, characterized in that: the diameter of the inner coating (6) is $d_{IC}$ (inner coating), the diameter of the buffer coating (7) is $d_{BC}$ (buffer coating), the diameter of the outer coating (8) is $d_{OC}$ (outer coating), the ratio of $d_{IC}$ and $d_{OC}$ is 0.65-0.85, the ratio of $d_{BC}$ and $d_{OC}$ is 0.75-0.9.

4. The small-diameter polarization maintaining optical fiber according to claim 3, characterized in that: the diameter $d_Q$ of the quartz optical fiber (5) is 50 um or 80 um, and the $d_{OC}$ is 90 um-140 um.

5. The small-diameter polarization maintaining optical fiber according to claim 3, characterized in that: the Young's modulus of the inner coating (6) is 0.05 Mpa-20 Mpa, and the Young's modulus of the outer coating (8) is 0.5 Gpa-1.5 Gpa; the Young's modulus of the buffer coating (7) is 0.1 Mpa-600 MPa, and the Young's modulus of the buffer coating (7) is between the inner coating (6) and the outer coating (8).

6. The small-diameter polarization maintaining optical fiber according to claim 1, characterized in that: when producing the inner coating (6), the buffer coating (7) and the outer coating (8), the inner coating (6) is coated with a single mold and cured by ultraviolet rays, then the buffer coating (7) and the outer coating (8) are simultaneously coated with a double molds, and finally the buffer coating (7) and the outer coating (8) are simultaneously cured by ultraviolet rays.

7. The small-diameter polarization maintaining optical fiber according to claim 1, characterized in that: the formula for calculating the relative refractive index difference is: $\Delta=(n_R$ (refractive index)$-n_Q)/(n_R+n_Q \cdot 100\%$, wherein $\Delta$ is the relative refractive index difference; when calculating the relative refractive index difference of the optical fiber core layer (1) and the quartz cladding (2), $n_R$ in the above formula is $n_O$; when calculating the relative refractive index difference of the buffer layer (3) and the quartz cladding (2), $n_R$ in the above formula is $n_B$; when calculating the relative refractive index difference of the periphery of stress zone (4) and the quartz cladding (2), $n_R$ in the above formula is $n_{SZP}$; and when calculating the relative refractive index difference of the center of stress zone (4) and the quartz cladding (2), $n_R$ in the above formula is $n_{SZC}$.

8. The small-diameter polarization maintaining optical fiber according to claim 1, characterized in that: the optical fiber core layer (1) is prepared through germanium doping, and the buffer layer (3) is prepared through shallow boron doping, and the stress zone (4) is prepared through deep boron doping.

9. The small-diameter polarization maintaining optical fiber according to claim 2, characterized in that: when producing the inner coating (6), the buffer coating (7) and the outer coating (8), the inner coating (6) is coated with a single mold and cured by ultraviolet rays, then the buffer coating (7) and the outer coating (8) are simultaneously coated with a double molds, and finally the buffer coating (7) and the outer coating (8) are simultaneously cured by ultraviolet rays.

10. The small-diameter polarization maintaining optical fiber according to claim 3, characterized in that: when producing the inner coating (6), the buffer coating (7) and the outer coating (8), the inner coating (6) is coated with a single mold and cured by ultraviolet rays, then the buffer coating (7) and the outer coating (8) are simultaneously coated with a double molds, and finally the buffer coating (7) and the outer coating (8) are simultaneously cured by ultraviolet rays.

11. The small-diameter polarization maintaining optical fiber according to claim 4, characterized in that: when producing the inner coating (6), the buffer coating (7) and the outer coating (8), the inner coating (6) is coated with a single mold and cured by ultraviolet rays, then the buffer coating (7) and the outer coating (8) are simultaneously coated with a double molds, and finally the buffer coating (7) and the outer coating (8) are simultaneously cured by ultraviolet rays.

12. The small-diameter polarization maintaining optical fiber according to claim 5, characterized in that: when producing the inner coating (6), the buffer coating (7) and the outer coating (8), the inner coating (6) is coated with a single mold and cured by ultraviolet rays, then the buffer coating (7) and the outer coating (8) are simultaneously coated with a double molds, and finally the buffer coating (7) and the outer coating (8) are simultaneously cured by ultraviolet rays.

13. The small-diameter polarization maintaining optical fiber according to claim 2, characterized in that: the formula for calculating the relative refractive index difference is:

$\Delta=(n_R \text{ (refractive index)}-n_Q)/(n_R+n_Q)\cdot 100\%$, wherein $\Delta$ is the relative refractive index difference; when calculating the relative refractive index difference of the optical fiber core layer (1) and the quartz cladding (2), $n_R$ in the above formula is $n_O$; when calculating the relative refractive index difference of the buffer layer (3) and the quartz cladding (2), $n_R$ in the above formula is $n_B$; when calculating the relative refractive index difference of the periphery of stress zone (4) and the quartz cladding (2), $n_R$ in the above formula is $n_{SZP}$; and when calculating the relative refractive index difference of the center of stress zone (4) and the quartz cladding (2), $n_R$ in the above formula is $n_{SZC}$.

14. The small-diameter polarization maintaining optical fiber according to claim 3, characterized in that: the formula for calculating the relative refractive index difference is: $\Delta=(n_R \text{ (refractive index)}-n_Q)/(n_R+n_Q)\cdot 100\%$, wherein $\Delta$ is the relative refractive index difference; when calculating the relative refractive index difference of the optical fiber core layer (1) and the quartz cladding (2), $n_R$ in the above formula is $n_O$; when calculating the relative refractive index difference of the buffer layer (3) and the quartz cladding (2), $n_R$ in the above formula is $n_B$; when calculating the relative refractive index difference of the periphery of stress zone (4) and the quartz cladding (2), $n_R$ in the above formula is $n_{SZP}$; and when calculating the relative refractive index difference of the center of stress zone (4) and the quartz cladding (2), $n_R$ in the above formula is $n_{SZC}$.

15. The small-diameter polarization maintaining optical fiber according to claim 4, characterized in that: the formula for calculating the relative refractive index difference is: $\Delta=(n_R \text{ (refractive index)}-n_Q)/(n_R+n_Q)\cdot 100\%$, wherein $\Delta$ is the relative refractive index difference; when calculating the relative refractive index difference of the optical fiber core layer (1) and the quartz cladding (2), $n_R$ in the above formula is $n_O$; when calculating the relative refractive index difference of the buffer layer (3) and the quartz cladding (2), $n_R$ in the above formula is $n_B$; when calculating the relative refractive index difference of the periphery of stress zone (4) and the quartz cladding (2), $n_R$ in the above formula is $n_{SZP}$; and when calculating the relative refractive index difference of the center of stress zone (4) and the quartz cladding (2), $n_R$ in the above formula is $n_{SZC}$.

16. The small-diameter polarization maintaining optical fiber according to claim 5, characterized in that: the formula for calculating the relative refractive index difference is: $\Delta=(n_R \text{ (refractive index)}-n_Q)/(n_R+n_Q)\cdot 100\%$, wherein $\Delta$ is the relative refractive index difference; when calculating the relative refractive index difference of the optical fiber core layer (1) and the quartz cladding (2), $n_R$ in the above formula is $n_O$; when calculating the relative refractive index difference of the buffer layer (3) and the quartz cladding (2), $n_R$ in the above formula is $n_B$; when calculating the relative refractive index difference of the periphery of stress zone (4) and the quartz cladding (2), $n_R$ in the above formula is $n_{SZP}$; and when calculating the relative refractive index difference of the center of stress zone (4) and the quartz cladding (2), $n_R$ in the above formula is $n_{SZC}$.

17. The small-diameter polarization maintaining optical fiber according to claim 2, characterized in that: the optical fiber core layer (1) is prepared through germanium doping, and the buffer layer (3) is prepared through shallow boron doping, and the stress zone (4) is prepared through deep boron doping.

18. The small-diameter polarization maintaining optical fiber according to claim 3, characterized in that: the optical fiber core layer (1) is prepared through germanium doping, and the buffer layer (3) is prepared through shallow boron doping, and the stress zone (4) is prepared through deep boron doping.

19. The small-diameter polarization maintaining optical fiber according to claim 4, characterized in that: the optical fiber core layer (1) is prepared through germanium doping, and the buffer layer (3) is prepared through shallow boron doping, and the stress zone (4) is prepared through deep boron doping.

20. The small-diameter polarization maintaining optical fiber according to claim 5, characterized in that: the optical fiber core layer (1) is prepared through germanium doping, and the buffer layer (3) is prepared through shallow boron doping, and the stress zone (4) is prepared through deep boron doping.

\* \* \* \* \*